United States Patent [19]

Stier

[11] Patent Number: 5,354,403
[45] Date of Patent: Oct. 11, 1994

[54] METHOD AND APPARATUS FOR APPLYING ORNAMENTS TO A WEB OF MATERIAL

[76] Inventor: Kenneth Stier, 220-55 46th Ave., Bayside, N.Y. 11361

[21] Appl. No.: 203,844

[22] Filed: Feb. 28, 1994

Related U.S. Application Data

[63] Continuation of Ser. No. 961,237, Oct. 15, 1992, abandoned.

[51] Int. Cl.$^5$ .............................................. B32B 31/04
[52] U.S. Cl. ..................... 156/297; 156/299; 156/302; 156/538; 156/552; 156/562; 29/10; 223/44
[58] Field of Search ............... 156/538, 552, 562, 297, 156/299, 302; 29/10; 223/44; 327/48, 61, 62, 85, 108, 111, 112, 141

[56] References Cited

U.S. PATENT DOCUMENTS

| | | |
|---|---|---|
| 283,235 | 8/1883 | Gilmore . |
| 1,649,540 | 11/1927 | Moscini . |
| 1,908,824 | 5/1933 | Devendor et al. . |
| 1,994,250 | 3/1935 | Meyers et al. ............................ 29/10 |
| 2,070,737 | 2/1937 | Kahan .................................. 29/10 |
| 2,260,572 | 10/1941 | La Russa et al. ....................... 29/10 |
| 2,482,537 | 9/1949 | Bustamante . |
| 2,858,597 | 11/1958 | Kraemer . |
| 3,045,309 | 7/1962 | Johnson, Sr. . |
| 3,328,082 | 3/1966 | Cornell . |
| 3,634,917 | 1/1972 | Kortick . |
| 3,905,848 | 9/1975 | Williams . |
| 3,911,722 | 10/1975 | Levine et al. . |
| 4,312,077 | 1/1982 | Petersson . |
| 5,073,223 | 12/1991 | Kurihara ............................. 156/541 |

*Primary Examiner*—Caleb Weston
*Attorney, Agent, or Firm*—Sprung Horn Kramer & Woods

[57] ABSTRACT

A method and apparatus for applying ornaments to a web of material, comprises providing a web of material to which ornaments are to be applied to at least one surface and having a longitudinal axis, step-wise advancing the web along the longitudinal axis into an application zone perpendicular to the longitudinal axis by alternately moving and stopping the web and applying ornaments to at least one surface of the web in the application zone when the web is stopped by moving a plurality of applicators perpendicularly with respect to the longitudinal axis and towards the at least one surface of the web.

11 Claims, 2 Drawing Sheets

METHOD AND APPARATUS FOR APPLYING ORNAMENTS TO A WEB OF MATERIAL

This application is a continuation of application Ser. No. 07/961,237, filed Oct. 15, 1992, now abandoned.

BACKGROUND OF THE INVENTION

The present invention is directed to a method and an apparatus for applying ornaments to a web of material.

It has been suggested that it would be desirable to have decorative webs, such as wallpaper, covered with ornaments such as nail heads, rivets, jewels and the like. Whereas it is known to apply these types of ornaments to fabric for clothing, the application of such ornaments to webs for the use as a wall covering presents additional problems. When a web is used for wall covering, it is important that the position of the ornaments be accurate and repeatable so that the patterns can be matched when mounted on a wall. This same accuracy is needed when cutting holes in webs used for conveyor belts, since these holes must receive cleats on items to be transferred by the conveyor belts and which are made with close tolerances.

Examples of methods of applying ornamentation to web material can be found in U.S. Pat. Nos. 3,911,722; 3,045,309; 283,235; 3,905,848; 1,908,824; 4,312,077 and 2,482,537. Moreover, various methods and apparatus for applying patterns of ornaments to material have been proposed in U.S. Pat. Nos. 1,649,540; 3,238,082; 3,634,917; and 2,858,597.

All of the prior art methods and apparatus have the disadvantage of not achieving the accuracy and repeatability that is necessary for applying ornamentation to webs of material which would be suitable for use as wall covering or for cutting holes in webs of material so that they would be suitable for use as conveyor belting.

SUMMARY OF THE INVENTION

The main object of the present invention is to provide a method and an apparatus for applying ornaments to a web of material and for cutting holes in material to eliminate the disadvantages of the prior art.

These objects and advantages of the present invention are achieved in accordance with the present invention by a method of applying ornaments to a web of material comprising the steps of providing a web of material to which the ornaments are to be applied, step-wise advancing the web along the longitudinal axis of the web by alternately moving and stopping the web and applying ornaments to at least one surface of the web when the web is stopped in an application zone which is disposed perpendicular to the longitudinal axis of the web, by moving a plurality of applicators perpendicularly with respect to the longitudinal axis of the web and towards the surface of the web.

The above objects and advantages of the present invention are also achieved in accordance with the present invention by an apparatus for applying ornaments to a web of material comprising means forming an application zone receptive of the web of material and including a plurality of actuatable ornament applicators movable towards at least one surface of the web, means mounting the applicators for movement along the application zone and perpendicular to the longitudinal axis of the web, means for step-wise advancing the elongated web of material along the longitudinal axis thereof and into the application zone by alternately moving and stopping the web and control means for effecting application of ornaments to at least one surface of the web in the application zone when the web is stopped. The control means comprises means for moving the plurality of applicators perpendicularly with respect to the longitudinal axis and means for actuating the applicators to move towards the surface of the web.

Another object of the present invention which is achieved in accordance with the present invention is the cutting of holes in a web of material. This object is achieved in accordance with the present invention by a method wherein a web is step-wise advanced along its longitudinal axis by alternately moving and stopping the web and punching holes in the surface of the web when the web is stopped by a moving a plurality of punches perpendicularly with respect to the longitudinal axis and towards the surface of the web.

This object is also achieved in accordance with the present invention by an apparatus including a plurality of actuatable punches movable towards the surface of the web, means mounting the punches for movement perpendicular to the longitudinal axis of the web, means for step-wise advancing the web along its longitudinal axis by alternately moving and stopping same and control means for effecting the punching when the web is stopped comprising means for moving the plurality of punches perpendicularly with respect to the longitudinal axis and for actuating the punches to move towards the surface of the web.

These and other features and advantages of the present invention will become more apparent from the following detailed description taken with the attached drawings, wherein:

DETAILED DESCRIPTION OF THE INVENTION

Figure 1:
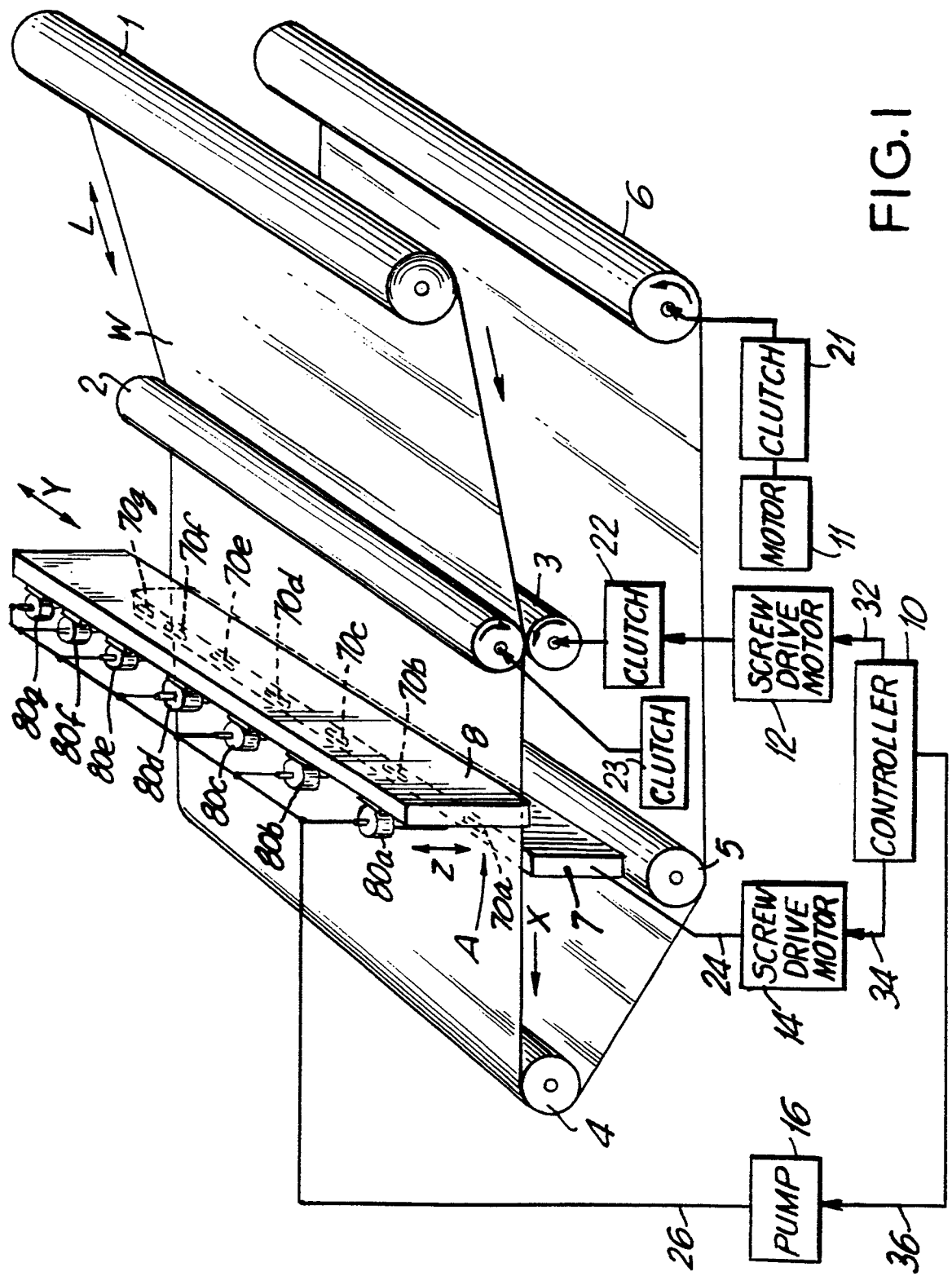
FIG. 1 is a schematic representation of the apparatus according to the present invention for carrying out the methods according to the present invention.

Referring now to FIG. 1, a web W of material such as fabric, paper, mylar or the like is unwound from a roll 1 by weighted roller and drive roller 3 which rotate in the direction of the arrows shown. The web W thus moves in the direction of its longitudinal axis L into an application zone A wherein ornaments are applied to the web or holes are punched in the web.

In the application zone are two rails 7 and 8 which are connected together for movement in the direction Y and which are parallel to each other and perpendicular to the longitudinal axis L of the web W.

The web is thereafter guided around roller 4 and under roller 5 to a take up roll 6 which is rotated in the direction of the arrow shown thereon.

Although the path of the web is shown in a folded configuration in FIG. 1, it is clear to one of ordinary skill in the art that a continuous linear path may be used for the web.

The roller 3 is driven by screw drive motor 12 which is controlled by a controller 10, which actuates the motor to move the web in a step-wise manner wherein the web is alternately moved and stopped. The weighted roller 2 and driven roller 3 are connected to antirotating clutches 23 and 22 to prevent any backwards rotation when stopped. Controller 10 actuates the motor 12 over line 32 and the motor is coupled to the roller 3 via antirotating clutch 22. Motor 11 is connected to roller 6 via clutch 21. The roller 6 is driven at a constant velocity by motor 11 which is constantly driving roller 6 and the clutch 21 controls the amount of grab on the web W so that the web is taut when it is stopped.

The rails 7 and 8 are mounted for movement together in the direction Y by means of a screw drive motor 14 which is controlled by controller 10 over line 34 and which is operatively coupled to the rails 7 and 8 by bar 24. The rail 7 holds dies 70a–70g, and the rail 8 holds actuatable applicators/punches 80a–80g. The dies and the applicators are aligned prior to use, and screw drive motor 14 moves the rails 7 and 8 in tandem so that the alignment is maintained while the position of the applicators and dies varies in the direction perpendicular to the longitudinal axis of the web.

The applicators 80a–80g are connected to a compressed air line 26, which is controlled by pump 16 to move a tool towards the die and retract it in the direction Z shown in FIG. 1 in response to an actuation by controller 10 over line 36.

During use, the web is advanced by motors 11 and 12 and when the web is stopped, or prior to the stopping of the web, the screw drive 14 moves rails 7 and 8 into a desired position along direction Y. After the web is stopped, the applicators 80a–g are actuated to apply an ornament to the web in conjunction to the dies 70a–g or punch holes in the web. Thereafter, the applicators are raised and the web is free to move again with the optional movement of the rails 7 and 8. Alternatively, the rails can be moved during the time that the web is stopped, into a plurality of different positions, wherein ornaments can be applied or holes can be punched before allowing the web to step-wise advance again.

In a particularly advantageous commercial embodiment of the present invention, the controller 10, the motors 12 and 14, and the pump 16 can be assembled from the Electrak 2000 programmable actuator system and the PAC-4180 EPI 125 computer control produced by Warner Electric of South Beloitte, Ill.

Figure 2:
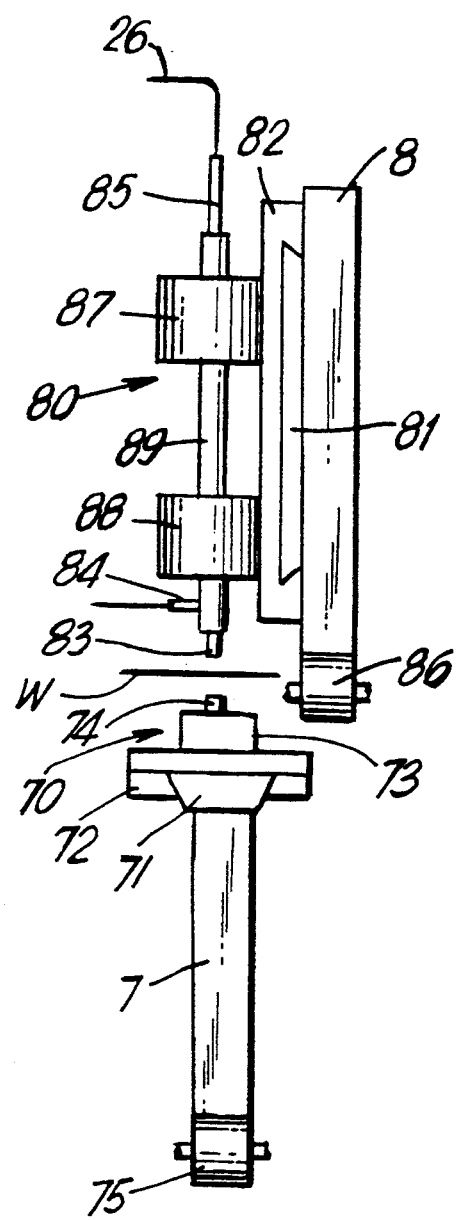
FIG. 2 is a detailed view of the applicator and punch shown in FIG. 1.

FIG. 2 shows a more detailed view of the applicator/punch of FIG. 1. As shown therein, the rail 8 includes a mounting member 81 to which a bracket 82 is slidably engaged. This enables the applicator/punch 80 to be slidably aligned along rail 8 and fixed in position by a set screw (not shown). The applicator/punch 80 includes a cylinder 89 bearing a piston 83. The cylinder 89 includes a compressed air input line 85, to which line 26 is connected. The piston 83 also includes a suction line 84 therein so as to enable the piston to hold an ornament by suction during use. The cylinder is held to member 82 via brackets 87 and 88. The rail is slidably mounted on roller 86 to enable the movement thereof along line Y.

The rail 7 is mounted for movement on roller 75 and includes a member 71 which receives a bracket 72 to enable the die base 73 and die 74 to be slidably moved therealong until it is in alignment with the applicator/punch 80. Thereafter, a set screw (not shown) can be tightened to fix it in place along rail 7. In the embodiment shown, it is understood that the same elements can be used for punching holes as for applying ornaments, with merely a change in the tip of the piston 83 and the die 74 carrying out either application of an ornament or the punching of a hole.

Figure 3:
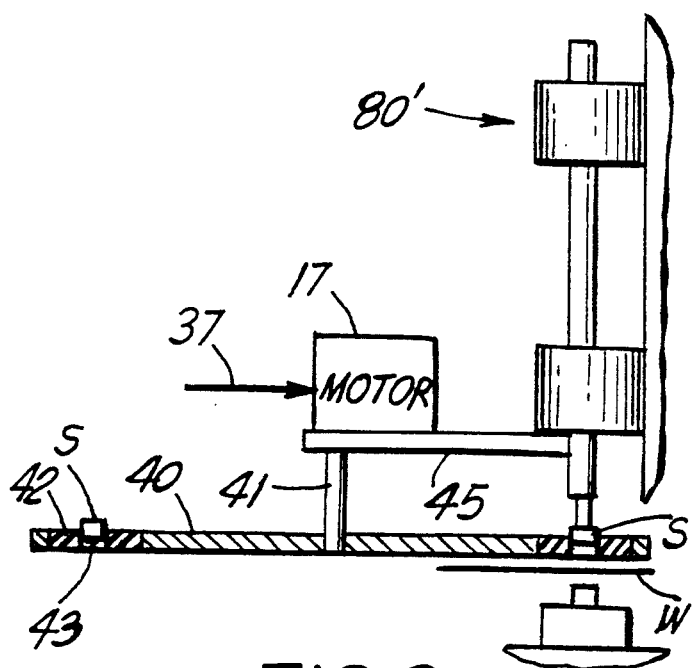
FIG. 3 is a side view of another embodiment of the applicator of FIG. 2.
Figure 4:
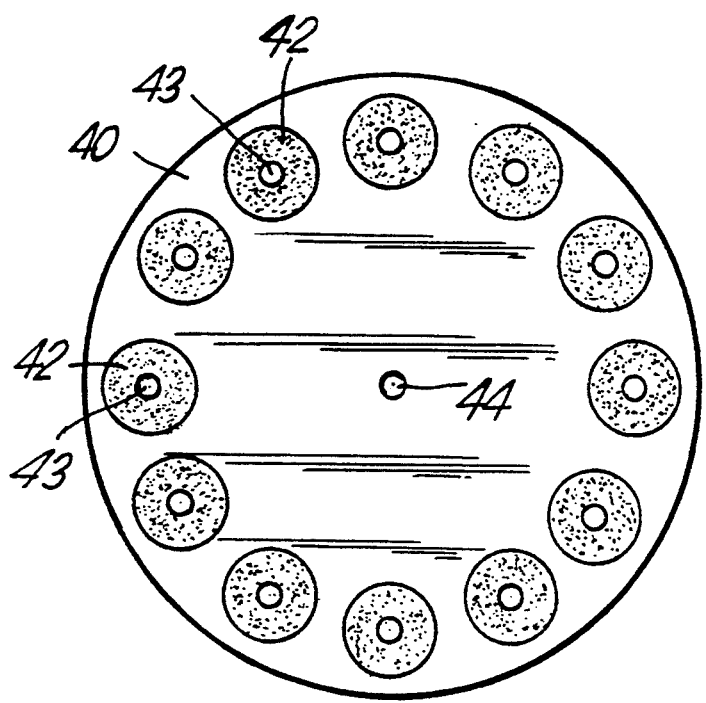
FIG. 4 is the top view of a component of FIG. 3.

In the application of ornaments to a web, it is desirable to automatically feed the ornaments to the applicator to enable a rapid processing of the web. This is carried out as shown in FIGS. 3 and 4 by a rotary cartridge 40 connected to the applicator 80' via a bracket 45. The cartridge 40 includes a plurality of elastic diaphragms 42 having holes 43 therein which receive the ornament to be applied. A motor 17 controlled via line 37 by controller 10 rotates the motor each time the web is advanced to the application zone and stopped to enable the applicator to apply an ornament S to the web W. Motor 17 rotates the cartridge 41 via shaft 41 connected in hole 44 in a step-wise manner in synchronism with the movement of the web. The elastic diaphragm 42 enables the ornament S to be held, but to yield to the force of the applicator and thereby release the ornament for application onto the web W.

From the above, it is clear that an apparatus and a method have been clearly illustrated and described. It will be understood, however, that other changes and modifications can be made by those skilled in the art in the particular features of the embodiments which have been described above for illustrative purposes without departing from the scope of the invention, as defined by the following claims.

What is claimed is:

1. A method of applying ornaments to a web of material, comprising the steps of:
   (a) providing a web of material to which ornaments are to be applied to at least one surface and having a longitudinal axis;
   (b) step-wise advancing the web along the longitudinal axis into an application zone perpendicular to the longitudinal axis by alternately moving and stopping the web including maintaining the web in a taut condition and preventing backward movement when stopped; and
   (c) applying ornaments to at least one surface of the web in the application zone when the web is stopped by providing a plurality of applicators and opposing dies, holding an ornament in each applicator by suction, moving each applicator and die perpendicularly along a width of the web to a desired application position and moving each applicator perpendicularly toward the at least one surface of the web to apply a held ornament to the web in conjunction with an opposing die.

2. The method according to claim 1, wherein the step of moving the applicators and dies comprises moving the applicators perpendicular to the longitudinal axis along the width of the web before the web is stopped and wherein the applicators are moved towards the web after the web is stopped.

3. The method according to claim 1, wherein the step of moving the applicators and dies comprises moving the applicators and dies along the width of the web after the web is stopped and wherein the applicators are moved towards the web after the web is stopped.

4. The method according to claim 1, wherein the step of applying comprises continuously feeding ornaments to the applicators for application when the web is stopped.

5. An apparatus for applying ornaments to a web of material, comprising:
   (a) means forming an application zone receptive of an elongated web of material and including a plurality of actuatable ornament applicators movable toward at least one surface of the web, wherein each applicator has suction means for retaining an ornament and a plurality of opposing dies disposed opposite the applicators;

(b) means mounting the applicators and dies for movement in the application zone along a width of the web to a desired application position relative to the width of the web;

(c) means for step-wise advancing the elongated web of material along a longitudinal axis thereof perpendicular to the application zone and into the application zone by alternately moving and stopping the web including means for maintaining the web taut when stopped and preventing backward movement; and (d) control means for effecting application of ornaments to at least one surface of the web in the application zone when the web is stopped comprising means for moving the plurality of applicators towards the at least one surface of the web to apply retained ornaments to the web in conjunction with the opposing dies.

6. The apparatus according to claim 5, wherein the means mounting the applicators and dies comprises a first rail on which the applicators are mounted and a second rail on which the dies are mounted and means mounting the rails for sliding movement perpendicular to the longitudinal axis of the web.

7. The apparatus according to claim 5, wherein the means for maintaining the web taut and preventing backwards movement comprises clutches and means for controlling grab on the web.

8. The apparatus according to claim 5, wherein the control means includes means for moving the applicators and dies along the width of the web before the web is stopped and means for moving the applicators towards the web after the web is stopped.

9. The apparatus according to claim 5, wherein the control means comprises means for moving the applicators and dies along the width of the web after the web is stopped and means for moving the applicators towards the web after the web is stopped.

10. The apparatus according to claim 5, further comprising means controlled by said control means for continuously feeding ornaments to the applicators.

11. The apparatus according to claim 10, wherein the continuous feeding means comprises a rotating cartridge for each applicator.

* * * * *